United States Patent
Huang et al.

(10) Patent No.: US 11,868,007 B2
(45) Date of Patent: Jan. 9, 2024

(54) LIQUID CRYSTAL DISPLAY PANEL AND LIQUID CRYSTAL DISPLAY DEVICE

(71) Applicant: HUIZHOU CHINA STAR OPTOELECTRONICS TECHNOLOGY CO., LTD., Guangdong (CN)

(72) Inventors: Dongchen Huang, Guangdong (CN); Chingyuan Cheng, Guangdong (CN)

(73) Assignee: HUIZHOU CHINA STAR OPTOELECTRONICS TECHNOLOGY CO., LTD., Huizhou Guangdong (CN)

( * ) Notice: Subject to any disclaimer, the term of this patent is extended or adjusted under 35 U.S.C. 154(b) by 705 days.

(21) Appl. No.: 16/961,686

(22) PCT Filed: Jul. 3, 2020

(86) PCT No.: PCT/CN2020/100047
§ 371 (c)(1),
(2) Date: Jul. 12, 2020

(87) PCT Pub. No.: WO2021/248595
PCT Pub. Date: Dec. 16, 2021

(65) Prior Publication Data
US 2023/0093959 A1    Mar. 30, 2023

(30) Foreign Application Priority Data
Jun. 12, 2020 (CN) .......................... 202010537526.9

(51) Int. Cl.
*G02F 1/13357* (2006.01)
*G02F 1/1335* (2006.01)
*G02F 1/1333* (2006.01)

(52) U.S. Cl.
CPC ...... *G02F 1/13362* (2013.01); *G02F 1/13338* (2013.01); *G02F 1/133531* (2021.01)

(58) Field of Classification Search
CPC ............. G02F 1/13362; G02F 1/13338; G02F 1/133531
(Continued)

(56) References Cited

U.S. PATENT DOCUMENTS 8,675,154 B2    3/2014 Park
8,817,210 B2 *  8/2014 Park ................. G02F 1/133528
                                                    349/122
(Continued)

FOREIGN PATENT DOCUMENTS

CN          2777593 Y     5/2006
CN        202330957 U     7/2012
(Continued)

*Primary Examiner* — Charles S Chang
(74) *Attorney, Agent, or Firm* — SOROKER AGMON NORDMAN RIBA

(57) ABSTRACT

A liquid crystal display panel and a liquid crystal display device are disclosed. The liquid crystal display panel includes a display module and a packaging cover plate disposed on a light-emitting side of the display module. The packaging cover plate includes a cover plate body and a first polarizer, wherein the first polarizer is disposed on a side of the cover plate body adjacent to the display module and/or on a side of the cover plate body away from the display module.

14 Claims, 6 Drawing Sheets

(58) Field of Classification Search
 USPC .......................................................... 349/12
 See application file for complete search history.

(56) References Cited

U.S. PATENT DOCUMENTS

| | | | |
|---|---|---|---|
| 2005/0099402 A1* | 5/2005 | Nakanishi | G06F 3/04164 345/173 |
| 2009/0015927 A1* | 1/2009 | Matsumura | G02B 5/0226 427/163.1 |
| 2015/0169105 A1* | 6/2015 | Tung | G06F 3/0446 427/79 |

FOREIGN PATENT DOCUMENTS

| | | |
|---|---|---|
| CN | 205015868 U | 2/2016 |
| CN | 208521105 U | 2/2019 |
| EP | 2381301 A1 | 10/2011 |
| JP | 2004054043 A | 2/2004 |

* cited by examiner

LIQUID CRYSTAL DISPLAY PANEL AND LIQUID CRYSTAL DISPLAY DEVICE

FIELD DISCLOSURE

The present disclosure relates to the technical field of displays, and in particular to a liquid crystal display panel and a liquid crystal display device.

BACKGROUND OF DISCLOSURE

With the wide application of large-size liquid crystal displays, there is a wide market demand for all-in-one conference device and electronic whiteboards used in business displays. A traditional liquid crystal display usually includes a display panel body and a packaging cover plate disposed on a light-emitting side of the display panel body, and protects the display panel body by the packaging cover plate.

However, in the traditional liquid crystal display, the strong ambient light reflects multiple times between the packaging cover plate and the display panel body after passing through the packaging cover plate, so that a color washout phenomenon occurs at a viewing angle (e.g. large viewing angle) of specular reflection, and leads to poor user experience.

SUMMARY OF INVENTION

Technical Problems

In existing liquid crystal displays, the strong ambient light reflects multiple times between a packaging cover plate and a display panel body after passing through the packaging cover plate so that a color washout phenomenon occurs at a viewing angle of specular reflection and it leads to technical problems about poor user experience.

Technical Solutions

In a first aspect, the present disclosure provides a liquid crystal display panel. The liquid crystal display panel includes: a display module; and a packaging cover plate disposed on a light-emitting side of the display module; wherein the packaging cover plate includes a cover plate body and a first polarizer, and the first polarizer is disposed on a side of the cover plate body adjacent to the display module and/or on a side of the cover plate body away from the display module.

In some embodiments, the packaging cover plate further includes a quarter-wave plate disposed on a side of the first polarizer away from the cover plate body.

In some embodiments, a first sealant is disposed between the packaging cover plate and the display module, the first sealant and the packaging cover plate are bonded to the display module, and the first sealant, the packaging cover plate, and the display module are commonly surrounded to form a cavity.

In some embodiments, the display module includes a display panel body and a touch layer disposed on a light-emitting side of the display panel body, and the first sealant, the packaging cover plate, and the touch layer are commonly surrounded to form the cavity.

In some embodiments, the display module further includes a second polarizer disposed on a side of the display panel body adjacent to the packaging cover plate, and a third polarizer disposed on a side of the display panel body away from the packaging cover plate.

In some embodiments, the second polarizer includes a large viewing angle polarizer, and a viewing angle of the large viewing angle polarizer is greater than a viewing angle of the third polarizer.

In some embodiments, a polarization direction of the first polarizer is paralleled to a polarization direction of the second polarizer.

In some embodiments, the second polarizer is disposed between the touch layer and the display panel body.

In some embodiments, a plurality of protrusions are distributed on a side of the packaging cover plate away from the display module.

In a second aspect, the present disclosure further provides a liquid crystal display device. The liquid crystal display device includes: a backlight module and a liquid crystal display panel, wherein the backlight module is disposed on a backside of the liquid crystal display panel.

The liquid crystal display panel includes: a display module; and a packaging cover plate disposed on a light-emitting side of the display module; wherein the packaging cover plate includes a cover plate body and a first polarizer, and the first polarizer is disposed on a side of the cover plate body adjacent to the display module and/or on a side of the cover plate body away from the display module.

In some embodiments, the packaging cover plate further includes a quarter-wave plate disposed on a side of the first polarizer away from the cover plate body.

In some embodiments, a first sealant is disposed between the packaging cover plate and the display module, the first sealant and the packaging cover plate are bonded to the display module, and the first sealant, the packaging cover plate, and the display module are commonly surrounded to form a cavity.

In some embodiments, the display module includes a display panel body and a touch layer disposed on a light-emitting side of the display panel body, and the first sealant, the packaging cover plate, and the touch layer are commonly surrounded to form the cavity.

In some embodiments, the display module further includes a second polarizer disposed on a side of the display panel body adjacent to the packaging cover plate, and a third polarizer disposed on a side of the display panel body away from the packaging cover plate.

In some embodiments, the second polarizer includes a large viewing angle polarizer, and a viewing angle of the large viewing angle polarizer is greater than a viewing angle of the third polarizer.

In some embodiments, a polarization direction of the first polarizer is paralleled to a polarization direction of the second polarizer.

In some embodiments, the second polarizer is disposed between the touch layer and the display panel body.

In some embodiments, a plurality of protrusions are distributed on a side of the packaging cover plate away from the display module.

Beneficial effects:

The intensity and amount of the ambient light reflected between the cover plate body and the display module are reduced by the first polarizer, and the quarter-wave plate combined with the first polarizer is used, so that the ambient light reflected between the cover plate body and the display module can no longer enter human eyes. Therefore, even if a user views the liquid crystal display panel at a viewing angle of the specular reflection, the user will not see an occurring color washout phenomenon, and the visibility of the large angle is increased. Moreover, the first polarizer and the quarter-wave plate do not affect a normal display of the liquid crystal display panel, and improve the user experience.

BRIEF DESCRIPTION OF DRAWINGS

The technical solutions and other beneficial effects of the present disclosure will be obvious by the detailed description of the specific embodiments of the present disclosure in combination with the drawings below.

Figure 1:
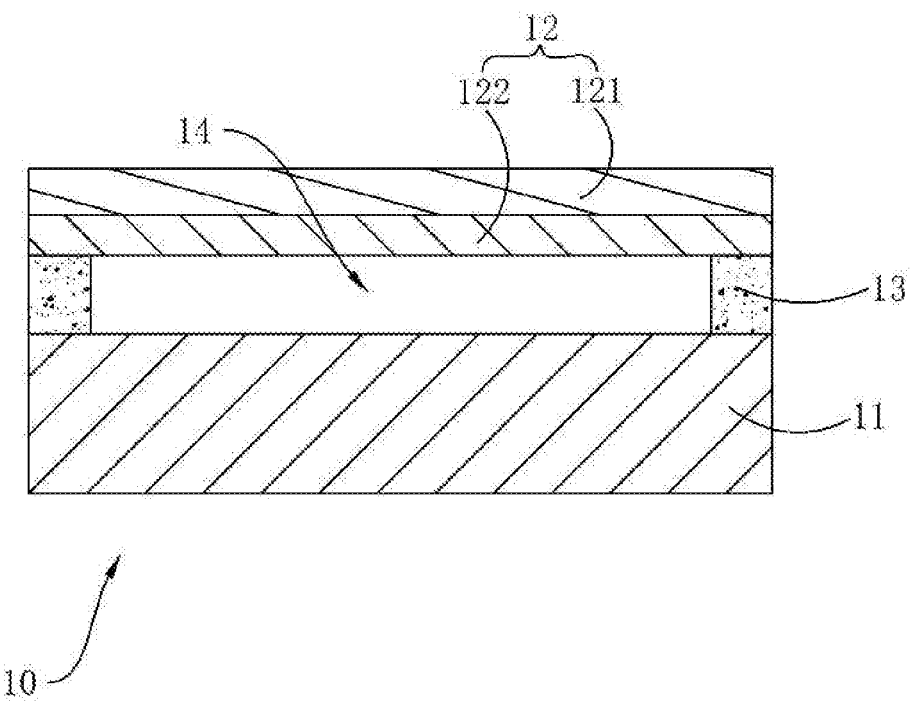
FIG. 1 is a schematic view of a first structure of a liquid crystal display panel of the present disclosure.

The reference numerals are identified as below:

10. liquid crystal display panel; 11. display module; 111. display panel body; 111a. array substrate; 111b. color filter substrate; 111c. liquid crystal layer; 111d. second sealant; 112. touch layer; 113. second polarizer; 114. third polarizer; 12. packaging cover plate; 121. cover plate body; 122. first polarizer; 13. first sealant; 14. cavity; 15. quarter-wave plate; 16. protrusions; 20. backlight module.

DETAILED DESCRIPTION OF EMBODIMENTS

The following description of each embodiment refers to the additional drawings, in order to illustrate the specific embodiments that may be implemented by the present disclosure. The directional terms mentioned in this disclosure, such as [upper], [lower], [front], [post], [left], [right], [inside], [outside], [side], are only refers to the direction of the additional drawings. Therefore, the terms are used to illustrate and understand the present disclosure, not to limit the present invention. In the drawings, structurally similar elements are denoted by the same reference numerals.

The present disclosure is directed to the technical problem that, in existing liquid crystal displays, the strong ambient light reflects multiple times between a packaging cover plate and a display panel body after passing through the packaging cover plate, so that a color washout phenomenon occurs at a viewing angle (e.g. large viewing angle) of specular reflection and it leads to technical problems about poor user experience.

A liquid crystal display panel as shown in FIG. 1. The liquid crystal display panel 10 includes a display module 11 and a packaging cover plate 12 disposed on a light-emitting side of the display module 11.

Specifically, the display module 11 is a liquid crystal display module, and the packaging cover plate 12 includes a cover plate body 121 and a first polarizer 122, The cover plate body 121 is a transparent plate, and the cover plate body 121 may be a transparent plastic plate or a transparent glass plate. An orthographic projection of the display module 11 on the cover plate body 121 is positioned inside of the cover plate body 121. That is, a size of the cover plate body 121 is greater than a size of the display module 11. The cover plate body 121 is used to protect the display module 11 from direct compression, collision, and contact with water vapor.

Specifically, the first polarizer 122 is disposed on a side of the cover plate body 121 adjacent to the display module 11 and/or on a side of the cover plate body 121 away from the display module 11.

It is noted that the first polarizer 122 is a linear polarizer, and the ambient light is generally similar to a circularly polarized light. When the ambient light passes through the first polarizer 122, almost half of the ambient light cannot pass through the first polarizer 122, and only a portion of the ambient light passes through the first polarizer 122 and then is reflected between the cover plate body 121 and the display module 11. The amount and the intensity of the reflected ambient light occurring between the cover plate body 121 and the display module 11 are little Therefore, even if a user views the liquid crystal display panel 10 at a viewing angle (e.g. large viewing angle) of the specular reflection, the user will not see the occurring color washout phenomenon, the visibility of the large-angle is increased, and the user experience is improved.

It is noted that the first polarizer 122 may be bonded on the cover plate body 121 in a full-fitting manner by an optical adhesive layer.

In an embodiment, the first polarizer 122 is disposed on a side of the cover plate body 121 adjacent to the display module 11, so as to protect the first polarizer 122 by the cover plate body 121.

Figure 2:
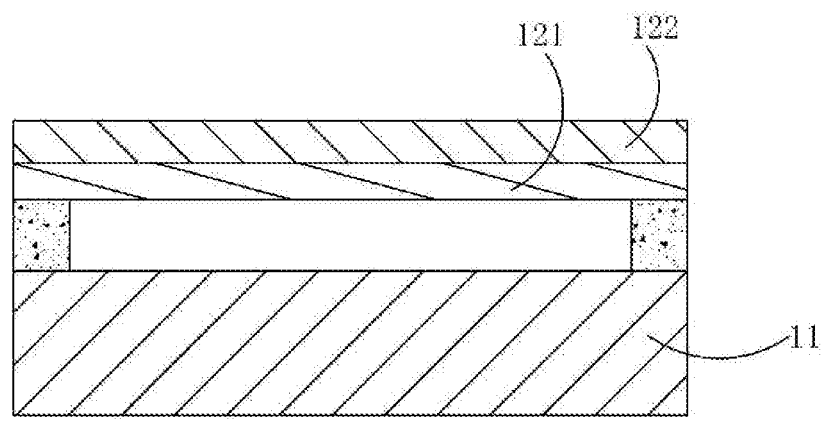
FIG. 2 is a schematic view of a second structure of the liquid crystal display panel of the present disclosure.

Refer to FIG. 2. The first polarizer 122 is also disposed on a side of the cover plate body 121 away from the display module 11. When the ambient light passes through the first polarizer 122, the intensity of the ambient light is substantially reduced by the first polarizer 122, and then the intensity of the ambient light is further reduced when the ambient light passes through the cover plate body 121, thereby further reducing the intensity and the amount of the ambient light reflected between the cover plate body 121 and the display module 11.

It is noted that the first polarizers 122 may be disposed on a side of the cover plate body 121 adjacent to the display module 11, and on a side of the cover plate body 121 away from the display module 11. When the first polarizers 122 are disposed on both sides of the cover plate body 121, polarization directions of the two first polarizers 122 are parallel.

Figure 3:
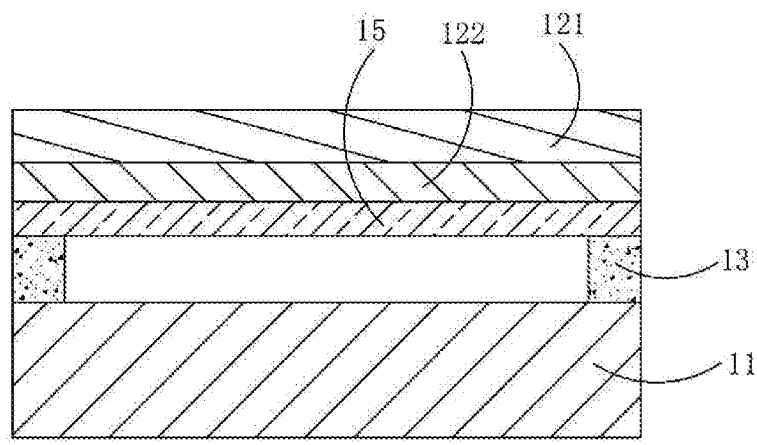
FIG. 3 is a schematic view of a third structure of the liquid crystal display panel of the present disclosure.

Refer to FIG. 3. In an embodiment, the packaging cover plate 12 further includes a quarter-wave plate 15 disposed on a side of the first polarizer 122 away from the cover plate body 121.

It is noted that the ambient light transforms to a polarized light after the ambient light passes through the first polarizer 122, wherein a polarization direction of the polarized light is the same as a polarization direction of the first polarizer 122. The ambient light then passes through the quarter-wave plate 15 and is reflected back by the display module 11, and the reflected ambient light passes through the quarter-wave plate 15 again. At this time, a polarization direction of the ambient light is orthogonal to a polarization direction of the first polarizer 122, so that the ambient cannot pass through the first polarizer 122 and enter human eyes. Therefore, the user will not see the occurring color washout phenomenon, and the visibility of the large-angle is increased, and the user experience is improved.

Specifically, a first sealant 13 is disposed between the packaging cover plate 12 and the display module 11, the first sealant 13 and the packaging cover plate 12 are bonded to the display module 11, and the first sealant 13, the packaging cover plate 12, and the display module 11 are commonly combined to form a cavity 14.

It is noted that the packaging cover plate 12 is bonded to the display module by the first sealant 13. The first sealant 13 may be an ultraviolet (UV) curing adhesive. The first sealant 13 is formed by coating sealant materials on either one of the packaging cover plate 12 and the display module 11, bonding the packaging cover plate 12 on the display module 11, and then curing the sealant materials via UV irradiation.

Specifically, the first sealant 13 is disposed on an edge region of the display module 11 and surrounds a light-emitting region of the display module 11. The cavity 14 formed and surrounded by the first sealant 13, the packaging cover plate 12, and the display module 11 may be full with air, so as to prevent the packaging cover plate 12 from sinking in a direction toward to the cavity 14 under a function of the atmosphere. In a practical example, the cavity 14 may also be a vacuum cavity.

It is noted that compared with a method of applying the optical adhesive to bond the packaging cover plate 12 on the display module 11, the packaging cover plate 12 is bonded to the display module 11 by the first sealant 13, and there are no optical adhesive layers in the cavity 14, so as to increase the light transmittance of the liquid crystal display panel 10. Moreover, mixed light of the ambient light and the light emitted by the display module 11 in the cavity 14 is reduced by combining the disposition of the first polarizer 122, thereby achieving the desirable visibility of the liquid crystal display panel under the large viewing angle.

Figure 4:
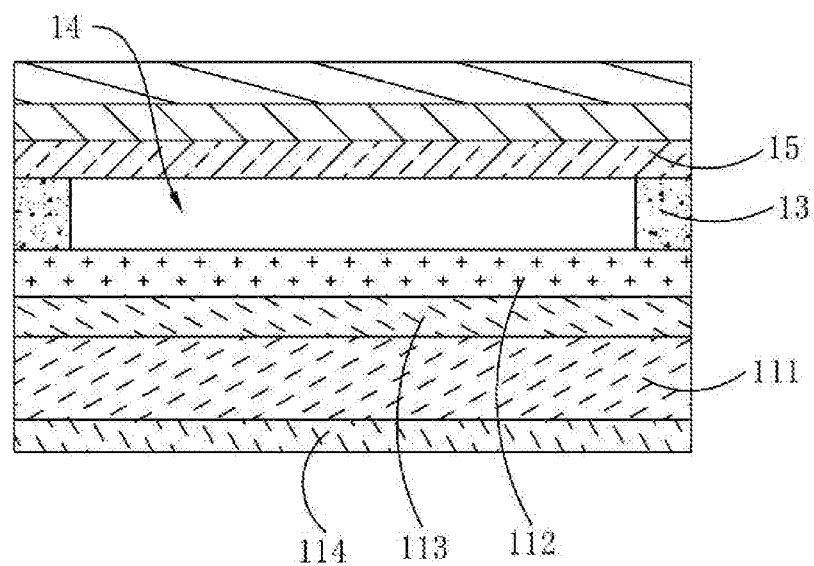
FIG. 4 is a schematic view of a fourth structure of the liquid crystal display panel of the present disclosure.

Refer to FIG. 4. The display module 11 includes a display panel body 111 and a touch layer 112 disposed on a light-emitting side of the display panel body 111. The first sealant 13, the packaging cover plate 12, and the touch layer 112 are commonly combined to form the cavity 14.

It is noted that the touch layer 112 may also include one or more of capacitive touch components, resistive touch components, acoustic touch components, mechanical touch components, and optical touch components. The touch layer 112 may be bonded to the display panel body 111 by the sealant, and the touch layer 112 may also be bonded to the display panel body 111 comprehensively by the optical adhesive.

Specifically, the display module 11 further includes a second polarizer 113 disposed on a side of the display panel body 111 adjacent to the packaging cover plate 12, and a third polarizer 114 disposed on a side of the display panel body 111 away from the packaging cover plate 12.

It is noted that the third polarizer 114 is used to transform a light beam emitted by a backlight source of the liquid crystal display panel 10 to the polarized light. The second polarizer 113 is used to analyze the polarized light modulated by the liquid crystal electricity, so as to generate the light and dark contrast, thereby producing a display picture. A polarization direction of the second polarizer 113 may be the same with or different from a polarization direction of the third polarizer 114.

Specifically, the second polarizer 113 includes a large viewing angle polarizer, and a viewing angle of the large viewing angle polarizer is greater than a viewing angle of the third polarizer 114.

It is noted that a common polarizer, for example, a viewing angle of the third polarizer 113 is 30° to 60°, and a viewing angle of the large viewing angle polarizer may be greater than 60°, thereby increasing the visibility of the large viewing angle of the liquid crystal display panel 10.

Specifically, a polarization direction of the first polarizer 122 is paralleled to a polarization direction of the second polarizer 113.

It is noted that the first polarizer 122 is used to prevent the ambient light from affecting the user experience, and the light emitted from the display panel body 111 can successfully pass through the first polarizer 122 and the second polarizer 113, so as to prevent the combination of the first polarizer 122 and the second polarizer 113 from affecting the normal display of the display module 11

Specifically, the second polarizer 113 is disposed between the touch layer 112 and the display panel body 111, so as to prevent the second polarizer 113 from affecting the touch sensitivity of the touch layer 112.

Figure 5:
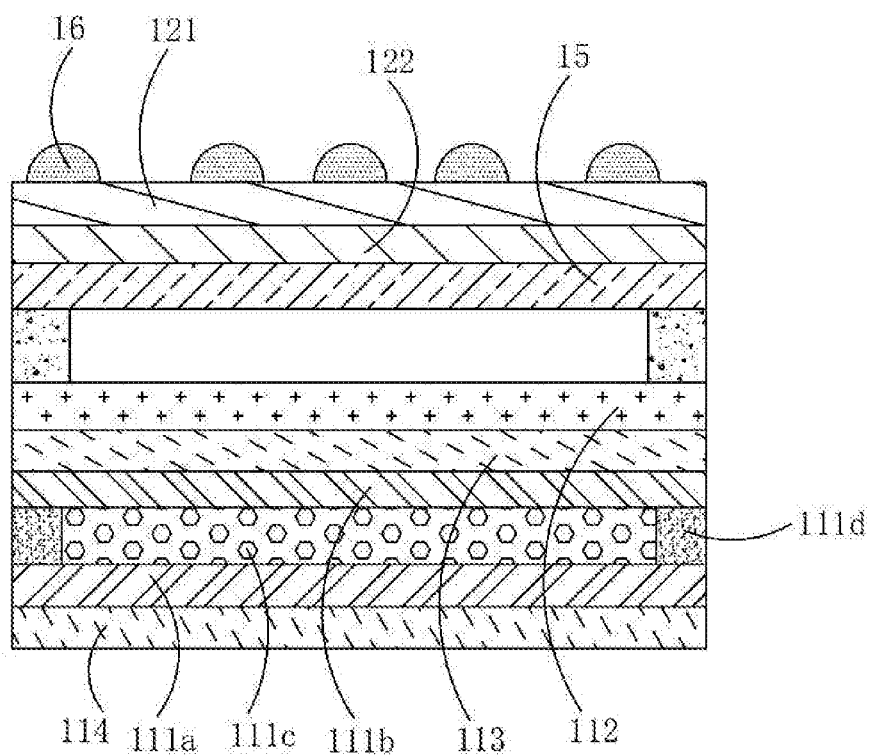
FIG. 5 is a schematic view of a fifth structure of the liquid crystal display panel of the present disclosure.

In an embodiment, as shown in FIG. 5, a plurality of protrusions 16 are distributed on a side of the packaging cover plate 12 away from the display module 11. The roughness of a surface of the packaging cover plate 12 may be increased by the protrusions 16, so as to reduce the specular reflection of the ambient light on the surface of the packaging cover plate 12 and improve the user experience.

It is noted that the protrusions 16 may be integrally formed with the packaging cover plate 12, or formed on the packaging cover plate 12 with different materials from the packaging cover plate 12. The protrusions 16 may be scattered or evenly distributed. The shape of the vertical section of the protrusions 16 can be semicircles, small semicircles, large semicircles, triangle, semi ellipses, rectangles, etc., just to list a few. The shape of all of the protrusions 16 can be the same or different, and the size of all of the protrusions 16 can be the same or different.

Specifically, the display panel body 111 includes an array substrate 111$a$ and a color filter substrate 111$b$ disposed opposite each other, wherein a second sealant 111$d$ is disposed between the array substrate 111$a$ and the color filter substrate 111$b$, the second sealant 111$d$, the array substrate 111$a$, and the color filter substrate 111$b$ are commonly combined to form an accommodating cavity, and a liquid crystal layer 111$c$ is disposed in the accommodating cavity.

The touch layer 112 is disposed on a side of the color filter substrate 111$b$ away from the array substrate 111$a$, and the third polarizer 114 is disposed on a side of the array substrate 111$a$ away from the color filter substrate 111$b$.

Specifically, a preparing material of the first sealant 13 can be the same with or different from a preparing material of the second sealant 111$d$. An orthographic projection of the first sealant 13 on the second sealant 111$d$ is positioned inside of the second sealant 111$d$, so as to prevent the second sealant 111$d$ from affecting the normal display of the liquid crystal display panel 10.

Figure 6:
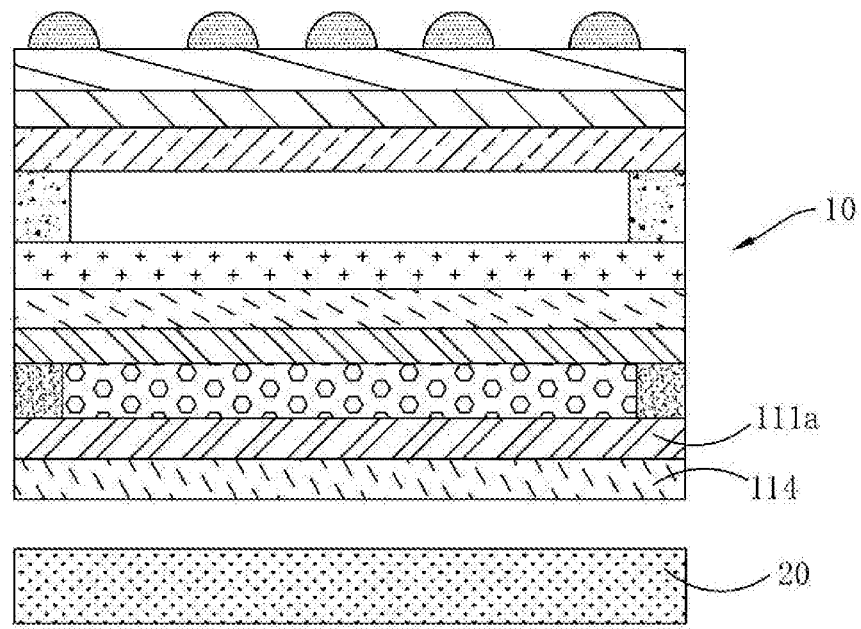
FIG. 6 is a schematic view of a structure of a liquid crystal display device in an embodiment of the present disclosure.

Based on the liquid crystal display panel 10, the present disclosure further provides a liquid crystal display device. Refer to FIG. 6, the liquid crystal display device includes a backlight module 20 and the liquid crystal display panel 10 as described in any one of the embodiments. The backlight module 20 is disposed on a backside of the liquid crystal display panel 10, which means the backlight module 20 is positioned on a side of the third polarizer 114 away from the array substrate 111$a$, so as to provide a light source for the liquid crystal display panel 10.

Beneficial effects of the present disclosure are as follows: the intensity and amount of the ambient light reflected between the cover plate body 121 and the display module 11 are reduced by the first polarizer 122, and the quarter-wave plate 15 combined with the first polarizer 122 is used, so that the ambient light reflected between the cover plate body 121 and the display module 11 can no longer enter human eyes.

Therefore, even if a user views the liquid crystal display panel 10 at a viewing angle of the specular reflection, the user will not see the occurring color washout phenomenon, and the visibility of the large-angle is increased. Moreover, the first polarizer 122 and the quarter-wave plate 15 do not affect the normal display of the liquid crystal display panel 10, and improve the user experience.

In the embodiments above, the description of each embodiment has its own emphasis. For a part that is not specifically described in a certain embodiment, please refer to the relevant description of other embodiments.

The principles and embodiments of the present disclosure are described in the specific examples. The description of the embodiments is only for helping understand the technical solutions and its core idea of the present disclosure. It should be understood by those skilled in the art that they can still modify the technical solutions described in the above embodiments or equivalently replace some of the technical features, and these modifications or replacements do not depart from the scope of the technical solutions of the embodiments of the present disclosure.

What is claimed is:

1. A liquid crystal display panel, comprising:
   a display module; and
   a packaging cover plate disposed on a light-emitting side of the display module;
   wherein the packaging cover plate comprises a cover plate body and a first polarizer, and the first polarizer is disposed on a side of the cover plate body adjacent to the display module and/or on a side of the cover plate body away from the display module;
   wherein a first sealant is disposed between the packaging cover plate and the display module, the first sealant and the packaging cover plate are bonded to the display module, and the first sealant, the packaging cover plate, and the display module are commonly surrounded to form a cavity;
   wherein the display module comprises a display panel body and a capacitive touch component disposed on a light-emitting side of the display panel body, and the first sealant, the packaging cover plate, and the capacitive touch component are commonly surrounded to form a cavity; and
   wherein the display module further comprises a second polarizer disposed on a side of the display panel body adjacent to the packaging cover plate, the second polarizer comprises a large viewing angle polarizer, and a viewing angle of the large viewing angle polarizer is greater than 60°.

2. The liquid crystal display panel as claimed in claim 1, wherein the packaging cover plate further comprises a quarter-wave plate disposed on a side of the first polarizer away from the cover plate body.

3. The liquid crystal display panel as claimed in claim 1, wherein the display module further comprises a third polarizer disposed on a side of the display panel body away from the packaging cover plate.

4. The liquid crystal display panel as claimed in claim 3, wherein the viewing angle of the large viewing angle polarizer is greater than a viewing angle of the third polarizer.

5. The liquid crystal display panel as claimed in claim 3, wherein a polarization direction of the first polarizer is paralleled to a polarization direction of the second polarizer.

6. The liquid crystal display panel as claimed in claim 3, wherein the second polarizer is disposed between the capacitive touch component and the display panel body.

7. The liquid crystal display panel as claimed in claim 1, wherein a plurality of protrusions are distributed on a side of the packaging cover plate away from the display module.

8. A liquid crystal display device, comprising a backlight module and a liquid crystal display panel, wherein the backlight module is disposed on a backside of the liquid crystal display panel; and the liquid crystal display panel comprises:
   a display module; and
   a packaging cover plate disposed on a light-emitting side of the display module;
   wherein the packaging cover plate comprises a cover plate body and a first polarizer, and the first polarizer is disposed on a side of the cover plate body adjacent to the display module and/or on a side of the cover plate body away from the display module;
   wherein a first sealant is disposed between the packaging cover plate and the display module, the first sealant and the packaging cover plate are bonded to the display module, and the first sealant, the packaging cover plate, and the display module are commonly surrounded to form a cavity;
   wherein the display module comprises a display panel body and a capacitive touch component disposed on a light-emitting side of the display panel body, and the first sealant, the packaging cover plate, and the capacitive touch component are commonly surrounded to form the cavity; and
   wherein the display module further comprises a second polarizer disposed on a side of the display panel body adjacent to the packaging cover plate, the second polarizer comprises a large viewing angle polarizer, and a viewing angle of the large viewing angle polarizer is greater than 60°.

9. The liquid crystal display device as claimed in claim 8, wherein the packaging cover plate further comprises a quarter-wave plate disposed on a side of the first polarizer away from the cover plate body.

10. The liquid crystal display device as claimed in claim 8, wherein the display module further comprises a third polarizer disposed on a side of the display panel body away from the packaging cover plate.

11. The liquid crystal display device as claimed in claim 10, wherein the viewing angle of the large viewing angle polarizer is greater than a viewing angle of the third polarizer.

12. The liquid crystal display device as claimed in claim 10, wherein a polarization direction of the first polarizer is paralleled to a polarization direction of the second polarizer.

13. The liquid crystal display device as claimed in claim 10, wherein the second polarizer is disposed between the capacitive touch component and the display panel body.

14. The liquid crystal display device as claimed in claim 8, wherein a plurality of protrusions are distributed on a side of the packaging cover plate away from the display module.

* * * * *